(12) United States Patent
Kirschner

(10) Patent No.: US 7,523,895 B1
(45) Date of Patent: Apr. 28, 2009

(54) SWAY BRACE AND METHOD FOR SECURING A PIPE OR CONDUIT AGAINST SWAY

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 304 days.

(21) Appl. No.: 11/445,490

(22) Filed: Jun. 1, 2006

(51) Int. Cl.
*F16L 3/00* (2006.01)

(52) U.S. Cl. .................... 248/62; 248/65; 248/230.1; 403/385; 285/197

(58) Field of Classification Search ............... 248/62, 248/65, 56, 72, 58, 47, 74.5, 219.3, 219.4, 248/230.1; 403/385, 388, 389, 400, 362, 403/396; 285/197, 199
See application file for complete search history.

(56) References Cited

U.S. PATENT DOCUMENTS

| | | | | |
|---|---|---|---|---|
| 780,420 | A * | 1/1905 | Gross ........................... 248/70 |
| 1,243,388 | A * | 10/1917 | Corley ......................... 248/215 |
| 2,630,074 | A * | 3/1953 | Grabinski .................... 104/112 |
| 2,856,216 | A * | 10/1958 | Witzel ......................... 403/225 |
| 2,931,605 | A * | 4/1960 | Kelly ........................... 248/59 |
| 2,937,226 | A * | 5/1960 | Kaminski, Jr. et al. .... 174/40 R |
| 2,956,103 | A * | 10/1960 | Steel et al. ................. 174/40 R |
| 3,233,850 | A * | 2/1966 | Merker et al. ................ 248/49 |
| 3,570,794 | A | 3/1971 | Kirschner ..................... 248/74 |
| 3,582,030 | A * | 6/1971 | Barrett, Jr. ................. 248/68.1 |
| 3,884,438 | A * | 5/1975 | Logsdon ....................... 248/59 |
| 4,172,578 | A * | 10/1979 | Pate ........................... 248/74.3 |
| 4,288,171 | A * | 9/1981 | Kottke ......................... 403/218 |
| 4,697,770 | A | 10/1987 | Kirschner ..................... 248/62 |
| 4,714,218 | A * | 12/1987 | Hungerford, Jr. ............. 248/62 |
| 5,004,193 | A * | 4/1991 | Kirschner ..................... 248/59 |
| 5,007,603 | A * | 4/1991 | Kirschner ..................... 248/59 |
| 5,072,903 | A * | 12/1991 | Griffin ......................... 248/72 |
| 5,111,770 | A * | 5/1992 | Weelink ...................... 119/523 |
| 5,145,132 | A * | 9/1992 | Kirschner ..................... 248/59 |
| 5,295,646 | A * | 3/1994 | Roth ........................... 248/58 |
| 5,323,988 | A * | 6/1994 | Handler ....................... 248/49 |
| 5,961,248 | A * | 10/1999 | Tourtellotte ................. 403/400 |
| 6,062,515 | A * | 5/2000 | Snyder ......................... 248/62 |
| 6,227,757 | B1 * | 5/2001 | Delouvee et al. ............ 403/400 |
| 6,234,277 | B1 * | 5/2001 | Kaczmarek ................. 187/414 |
| 6,296,211 | B1 * | 10/2001 | Snyder ......................... 248/71 |
| 6,464,182 | B1 * | 10/2002 | Snyder ......................... 248/71 |
| 6,508,441 | B1 | 1/2003 | Kirschner ..................... 248/62 |
| 6,594,869 | B1 * | 7/2003 | Chen ......................... 24/274 R |
| 6,629,678 | B1 * | 10/2003 | Kirschner ................. 248/228.6 |
| 6,802,569 | B1 * | 10/2004 | Conard et al. .............. 301/5.24 |

* cited by examiner

*Primary Examiner*—Kimberly T Wood
(74) *Attorney, Agent, or Firm*—Connolly Bove Lodge & Hutz LLP

(57) ABSTRACT

A sway brace including a U-shaped strap with flanges at each end. The flanges are mounted to two mounting fixtures including block bodies and passages therethrough. Mounting surfaces on the fixtures are parallel to the centerline of the passage to receive the flanges of the U-shaped strap. Threaded members affix the flanges to the mounting surfaces of the mounting fixtures. The threads are placed symmetrically of the centerline of the passage and displaced from one another.

14 Claims, 2 Drawing Sheets

SWAY BRACE AND METHOD FOR SECURING A PIPE OR CONDUIT AGAINST SWAY

BACKGROUND OF THE INVENTION

The field of the present invention is bracing for preventing pipes from swaying relative to an associated building structure.

Building codes, as well as competent construction practice, require the securing of fluid lines and other utilities to the structure of a building to brace such lines against damaging movement resulting from seismic disturbances. Sway braces have been designed for securing numerous types of fluid supply lines. An example of such secured lines is fire control water sprinkler distribution pipes. When sprinkler systems are used in buildings, it is required that the water distribution pipes be adequately braced so that, in the event of an earthquake, the pipes will not unduly sway relative to adjacent portions of the building and separate or produce excessive leakage at the pipe joints. Such bracing is not necessarily contemplated for sustaining the full load of the pipe during normal operation. Indeed, the sway brace may actually be loosely fit on the pipe or utility line pending engagement during seismic activity.

One such brace is illustrated in U.S. Pat. No. 6,508,441. Other types of sway brace structures are exemplified in U.S. Pat. Nos. 4,697,770 and 3,570,794. The disclosures of all three patents are incorporated herein by reference. Traditionally, sway braces are formed from sheet metal as can be seen in the referenced patents. They include a mechanism to grip the pipe or conduit, a constraint tie and a bracket or fastener to attach to structure with which the pipe or conduit is to have little relative movement.

SUMMARY OF THE INVENTION

The present invention is directed to sway bracing employing U-shaped straps.

In a first separate aspect of the present invention, two mounting fixtures which each include a block body, a passageway extending through the block body and a mounting surface parallel to the centerline of the passage are positioned at the two ends of the strap. Flanges extend substantially perpendicular to the U-shaped straps at their ends to be affixed to the mounting surfaces of the bodies. Threaded members symmetrically engage the two mounting fixtures at the mounting surfaces to retain the flanges of the U-shaped strap.

In a second separate aspect of the present invention, sway brace assemblies for a pre-selected outside diameter pipe include U-shaped straps and sets of two mounting fixtures mounted to the ends of each strap. Each set of two mounting fixtures includes passages through the fixtures, respectively, which are of equal diameter. The fixtures also include mounting surfaces. Different sets have different passage diameters but the distance between the mounting surface and the wall of the passage on each mounting fixture is equal for all sets.

In a more inclusive apparatus aspects of the present invention, the sway brace further includes a tie which is held within the passages of the mounting fixtures. This tie is ultimately connected through a bracket to the structure of the associated building.

In a this separate aspect of the present invention, a method for securing a pipe or conduit against sway relative to a building structure includes selecting a U-shaped strap having an inside width substantially equal to the outside diameter of the pipe or conduit and an inside depth dimension less than the outside diameter of the pipe or conduit and selecting two mounting fixtures having block bodies with equal diameter passages therethrough, mounting surfaces on one side or each and an equal distance between the passages and the mounting surfaces from a series of mounting fixtures having different diameter passages and equal distances between the passages and the mounting surfaces. The selected U-shaped strap are assembled with the two selected mounting fixtures at the ends of the U-shaped strap and with the depth of the U-shaped strap and the distance between the passages and the mounting surfaces being additive to substantially equal the outside diameter of the pipe or conduit. The resulting structure may then be associated with a tie and a bracket to be affixed to the building structure.

The foregoing invention provides a structure and method by which strap elements may be associated with mounting fixtures specifically selected for a given tie which is typically a length of pipe from one inch to two inches in diameter. The threaded members mounting the U-shaped strap to the mounting fixtures are symmetrically arranged relative to the centerline of the passage and spaced apart to accommodate various passage sizes as may be necessary to receive various sizes of pipe. In this way, a versatile supply may be maintained to accommodate various sizes of constraining pipe upon which the sway brace is mounted and various sizes of constrained pipe or utility conduit.

Accordingly, it is an object of the present invention to provide an improved sway brace. Other and further objects and advantages will appear hereinafter.

DETAILED DESCRIPTION OF THE PREFERRED EMBODIMENT

The Figures illustrate a sway brace including a U-shaped strap 10. The strap 10 contemplates a specific diameter of pipe to be retained therein and does not naturally conform to the shape of the pipe or conduit as it is typically rigid. Further, the pipe or conduit is not supported by the strap 10 such that the strap 10 would conform to a constant load. The strap has two ends which conclude with flanges 12, 14. The flanges 12, 14 extend substantially perpendicular to the U-shaped strap 10 at the ends of the strap 10 in opposite directions from one another as can be seen in the Figures. The strap 10 is typically two inches wide and may be formed to receive a six inch pipe, typical in the sprinkler industry. Other sizes are equally accommodated.

Figure 3:
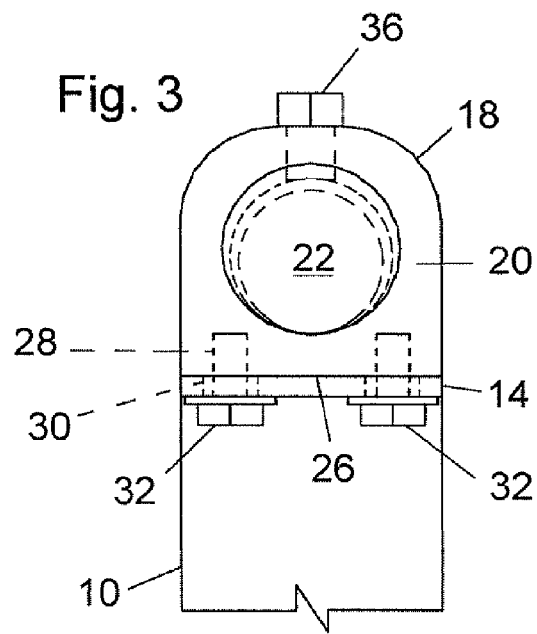
FIG. 3 is an end view of the sway brace of FIG. 1 further illustrating other passage diameter sizes and placement.

A set of two mounting fixtures 16, 18 are contemplated to mate with one strap 10 at the flanges 12, 14. The mounting fixtures 16, 18 each include a block body 20 which is typically cast. A passage 22 extends therethrough. The passage 22 is conveniently circular in cross section. The diameters of each passage 22 in the set of two would typically be the same and are specifically selected to accommodate a specific size of pipe such as the pipe 24 illustrated in FIG. 4. The same block body 20 with different diameter passages 22 is contemplated for use with different diameter pipe 24. FIG. 3 shows two smaller sizes of passage 22 in phantom. The passages 22 of sets for various diameters of pipe 24 are all arranged with the distance between the wall of the passage 22 and the mounting surface of the block body equal. The passages 22 each define a centerline 25.

Figure 1:
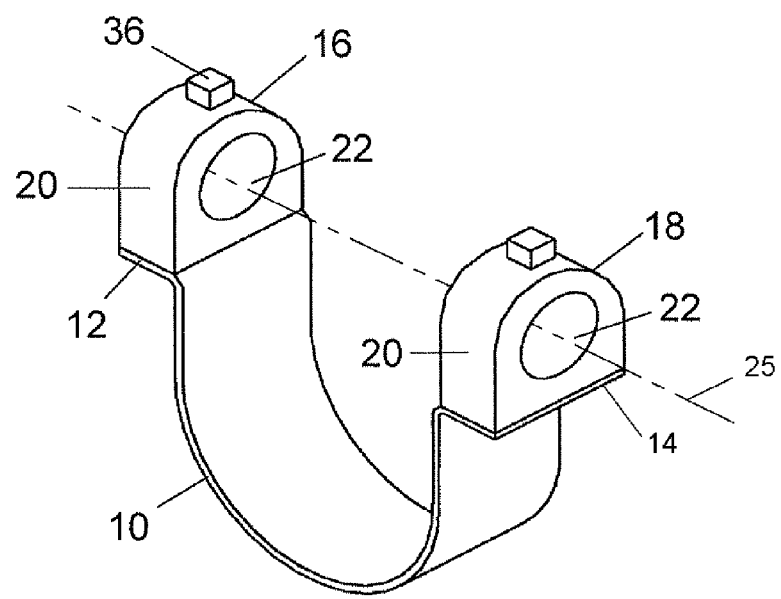
FIG. 1 is a perspective view of a sway brace.
Figure 2:
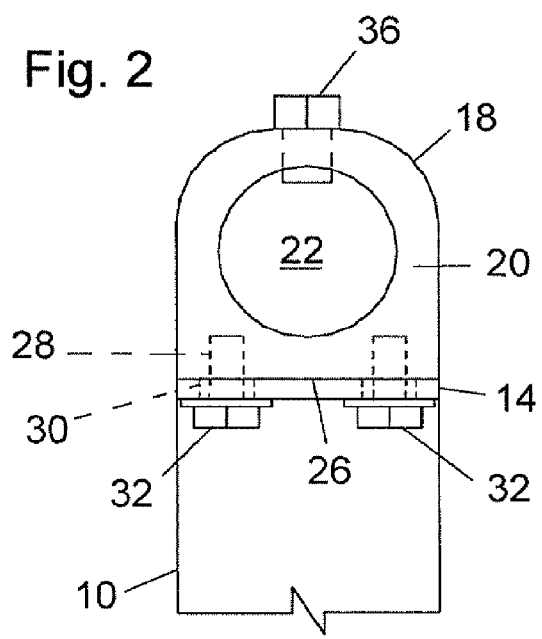
FIG. 2 is an end view of the sway brace of FIG. 1.

One side of the bodies 20 of the mounting fixtures 16, 18 defines a mounting surface 26. These mounting surfaces 26 are shown to be parallel to the centerline defined by each of the passages 22. Tapped holes 28 extend into the mounting surface 26. These holes 28 are symmetrically arranged relative to the centerline of the passage 22 as is best illustrated in FIG. 2. As such, forces during operation on the strap 10 tend to be uniformly distributed at the mounting with the mounting fixtures 16, 18. The block bodies 20 provide the capacity for a closer tolerance on the positioning of the mounting surface 26, a closer tolerance on the distance from that surface to the passage 22 and greater integrity and closer tolerance on the tapped holes 28 than provided by sheet metal formation.

The flanges 12, 14 include two mounting holes 30 therethrough capable of aligning with the tapped holes 28 for receipt of threaded members 32. These threaded members are conveniently threaded bolts which are threadably engaged with the tapped holes 28. The bolts 32 are tightened against the flanges 12, 14 to present an assembled sway brace.

Figure 4:
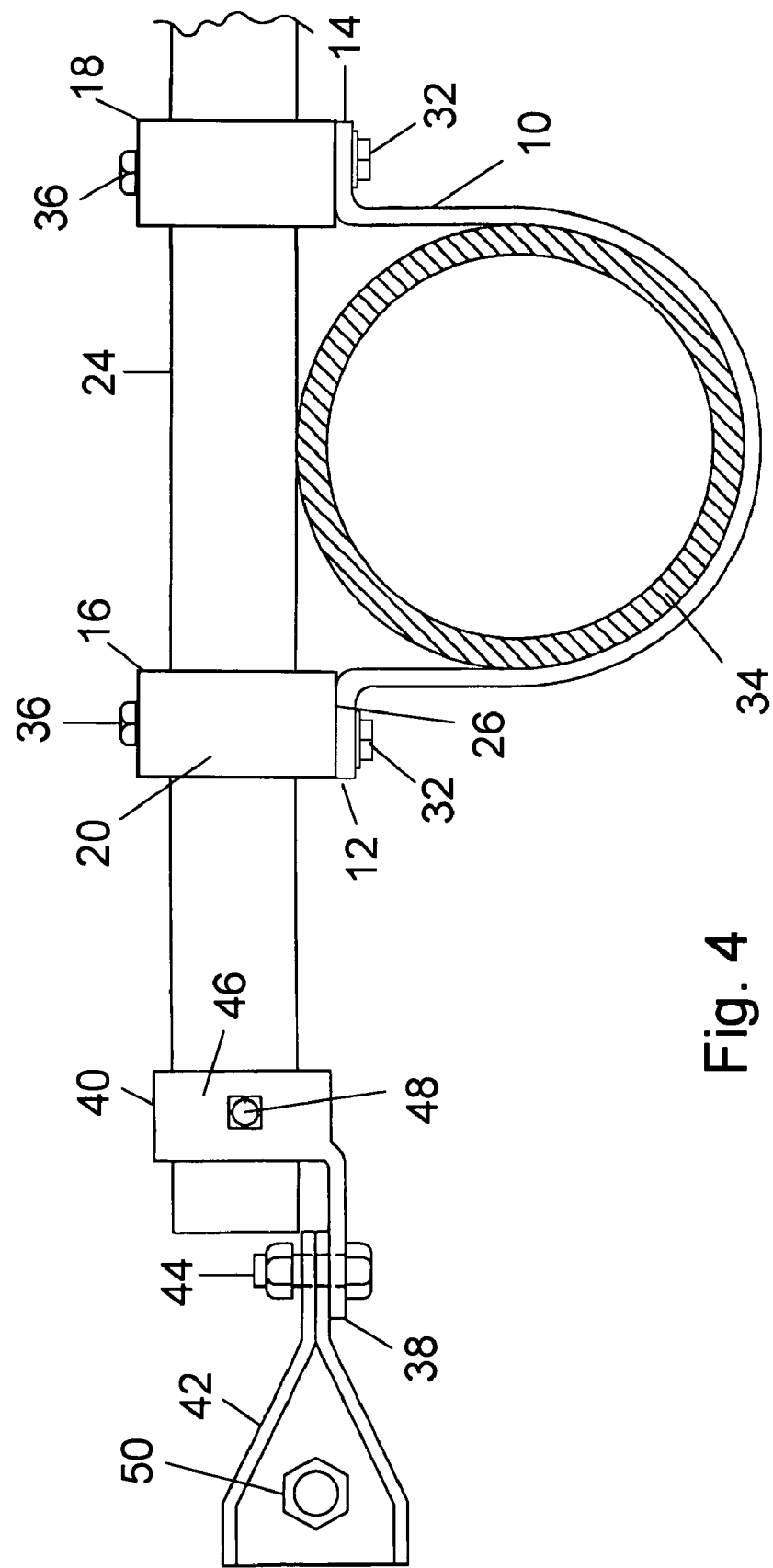
FIG. 4 is a front view of the sway brace of FIG. 1 with an associated tie and a supported pipe, the pipe being in cross section.

The sway brace is shown in FIG. 4 with additional components facilitating its mounting with the structure of an associated building. A sprinkler pipe or other utility conduit 34 is shown in place within the U-shaped strap 10. The mounting fixtures 16, 18 associated with the U-shaped strap 10 are also shown in assembly with the rigid tie 24 which is most conveniently a pipe. Set screws 36 retain the mounting fixtures 16, 18 by extending through the bodies 20 to lock against the pipe 24.

A bracket 38 is associated with one end of the pipe 24. The bracket 38 is defined by two elements 40, 42 with a pinned coupling 44 provided by a bolt and nut. The element 40 includes a first attachment which is shown to be a pipe collar 46 that is positioned about the pipe 24. A set screw 48 retains the collar 46 on the pipe 24. The element 46 has a second attachment which is a bolt hole to receive a bolt and nut 50. The bolt hole has an access which is perpendicular to the pinned coupling 44 for maximum mounting flexibility.

FIG. 4 also illustrates the relationship of the bracket to the constrained pipe 34. Without necessarily tightly gripping the pipe 34 of pre-selected outside diameter which typically conforms to an industry standard, the bracket is sized to closely constrain the pipe 34 from movement. The U-shaped strap 10 is shorter than conventional such straps which are typically anchored to a flat surface.

To place the constraining pipe 24 close to the constrained pipe 34, the distance between the mounting surface 26 and the passage 22 is added to the depth of the U-shaped strap 10 to establish the close fit. As noted earlier, the mounting fixtures 16, 18 are constructed with a common distance between the passage 22 and the mounting surface 26 regardless of the diameter of the passage 22 as may be required to accommodate the constraining pipe 24. This feature establishes the correct fit for the constrained pipe 34 with every U-shaped strap 10 selected with an inside width appropriate for the pre-selected outside diameter of the pipe 34 regardless of the diameter of the constraining pipe 24. As such, a single strap size is employable with any of several block bodies 20 configured for different diameter constraining pipe 24.

To allow assembly, the passages 22 are bigger than the diameter of the anticipated constraining pipe 24 which allows both the pipe 24 to be assembled with the block bodies 20 and the brace to be adjusted along the constrained pipe 34 facility. The oversize of the passages 22 to the tie pipe 24 is not so great that the setscrews 36 cannot tightly force the pipe 24 diametrically across the passage to a position most adjacent the mounting surfaces 26. Upon tightening of the setscrews 36, the brace tightens up on the pipe 24 and achieves a snug fit about the pipe 34.

Accordingly, an improved sway brace has been shown and described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A sway brace comprising
   a U-shaped strap including
      two ends and
      flanges extending substantially perpendicular to the U-shaped strap at the ends, respectively;
   two mounting fixtures, each mounting fixture including
      a block body,
      a passage extending through the block body and defining a centerline, and
      a mounting surface parallel to the centerline of the passage;
   threaded members affixing the flanges to the mounting fixtures in juxtaposition with the mounting surfaces, respectively, the threaded members being placed symmetrically of the centerline and displaced from one another.

2. The sway brace of claim 1, the block bodies being castings.

3. The sway brace of claim 1 further comprising
   setscrews extending through the block bodies into the passages, respectively.

4. The sway brace of claim 3 further comprising
   a rigid tie extending through the passage in each mounting fixture with the passage being larger than the tie to provide space therebetween, the setscrews being disposed diametrically opposite the mounting surface on the block bodies and extendable to engage the tie and hold the tie against the side of the passage most adjacent the mounting surface.

5. The sway brace of claim 4 further comprising
   a bracket including
      a first element having a first attachment,
      a second element having a second attachment and
      a pinned coupling between the first and second elements, the first element being affixed to the rigid tie.

6. The sway brace of claim 5, the rigid tie being a pipe and the first attachment being a pipe collar having a collar setscrew.

7. The sway brace of claim 1, each threaded member being a threaded bolt, the flanges each having two mounting holes therethrough to receive the bolts and the block bodies having tapped holes through the mounting surfaces to threadably receive the bolts.

8. The sway brace of claim 1, the flanges extending away from one another.

9. The sway brace of claim 1, the passages being circular in cross section.

10. A sway brace comprising
    a U-shaped strap including
       two ends and
       flanges extending away from one another and substantially perpendicular to the U-shaped strap at the ends, respectively, each flange including two mounting holes;

two mounting fixtures, each mounting fixture including
a block body,
a circular passage extending through the block body and defining a centerline and
a mounting surface parallel to the centerline of the passage, each mounting surface having two tapped holes;
setscrews extending through the block bodies into the passages, respectively;
threaded bolts threadably engaging the tapped holes and affixing the flanges through the mounting holes to the mounting fixtures in juxtaposition with the mounting surfaces, respectively, the threaded bolts being symmetrically oriented to the centerline and displaced from one another;
a pipe extending through the passage in each mounting fixture, the setscrews extendable to engage the pipe;
a bracket including
a first element having a pipe collar with a collar setscrew,
a second element having an attachment and
a pinned coupling between the first and second elements, the first element being affixed to the pipe by the collar setscrew.

11. Sway brace assemblies for a pre-selected outside diameter pipe, comprising
U-shaped straps each including
two ends and
flanges extending substantially perpendicular to the U-shaped straps at the ends, respectively;
sets of two mounting fixtures, each mounting fixture including
a block body,
a passage circular in cross section extending through the block body and defining a centerline, the passages of the mounting fixtures of each set being of equal diameter and there being multiple sets with passages of different diameters, and
a mounting surface parallel to the centerline of the passage, the distance between the mounting surface and the passages being equal on all sets;
threaded members affixing the flanges to the mounting fixtures in juxtaposition with the mounting surfaces, respectively, the threaded members being placed symmetrically of the centerline and displaced from one another.

12. A method for securing a pipe or conduit against sway relative to a building structure, comprising
selecting a U-shaped strap having an inside width substantially equal to the outside diameter of the pipe or conduit and an inside depth dimension less than the outside diameter of the pipe or conduit;
selecting two mounting fixtures having block bodies with equal diameter passages therethrough, mounting surfaces on one side or each and an equal distance between the passages and the mounting surfaces, respectively, from a series of mounting fixtures having different diameter passages and equal distances between the passages and the mounting surfaces, respectively;
assembling the selected U-shaped strap with the two selected mounting fixtures at the ends of the U-shaped strap and with the depth of the U-shaped strap and the distance between the passages and the mounting surfaces being additive to substantially equal the outside diameter of the pipe or conduit.

13. The method of claim 12 further comprising
inserting a tie through the passages of the two selected mounting fixtures, selecting the two mounting fixtures including selecting a diameter of the passages slightly larger than the tie to allow facile location of the tie in the passages and facile movement of the U-shaped strap on the pipe or conduit;
tightening setscrews extending through the block bodies diametrically opposed to the mounting surfaces, respectively, to hold the tie against the side of the passage most adjacent the mounting surface.

14. The method of claim 13 further comprising
attaching the tie to the building structure.

* * * * *